United States Patent [19]
Mogamiya et al.

[11] Patent Number: 5,096,289
[45] Date of Patent: Mar. 17, 1992

[54] ARITHMETIC OPERATING MEANS

[75] Inventors: Makoto Mogamiya, Tokyo; Nobuharu Suzuki, Aichi, both of Japan

[73] Assignee: Asahi Kogaku Kogyo Kabushiki Kaisha, Tokyo, Japan

[21] Appl. No.: 602,175

[22] Filed: Oct. 23, 1990

[30] Foreign Application Priority Data

Oct. 27, 1989 [JP] Japan .................................. 1-281115

[51] Int. Cl.⁵ .......................... G01C 3/00; G01C 5/00; G03B 3/00
[52] U.S. Cl. ...................................... 356/1; 354/403; 354/409
[58] Field of Search .................... 356/1; 354/402, 403, 354/404, 409, 219, 222, 223; 250/201.6

[56] References Cited

U.S. PATENT DOCUMENTS

| | | | |
|---|---|---|---|
| 4,019,191 | 4/1977 | Miyata . | |
| 4,021,823 | 5/1977 | Miyata . | |
| 4,047,187 | 9/1977 | Mashimo et al. | 354/402 |
| 4,459,004 | 7/1984 | Morizumi . | |
| 4,470,681 | 9/1984 | Johnson | 354/403 |
| 4,487,495 | 12/1984 | Kimata et al. . | |
| 4,534,636 | 8/1985 | Sugawara | 354/403 |
| 4,574,314 | 3/1986 | Weinblatt | 354/400 |

Primary Examiner—Stephen C. Buczinski
Attorney, Agent, or Firm—Sandler, Greenblum, & Bernstein

[57] ABSTRACT

An object distance measuring device in a camera, including an active object distance measuring mechanism for emitting measuring light toward an object to be photographed and receiving the measuring light as reflected by the object to detect the object distance is provided. A measuring zone is provided in a finder to indicate a measuring position at which the measurement of the object distance by the active object distance measuring mechanism is effected. A device is provided for varying the position of the measuring zone in the finder, and a device for varying the direction of the emission of the measuring light by the active object distance measuring mechanism in accordance with the varied position of the measuring zone is also provided.

14 Claims, 9 Drawing Sheets

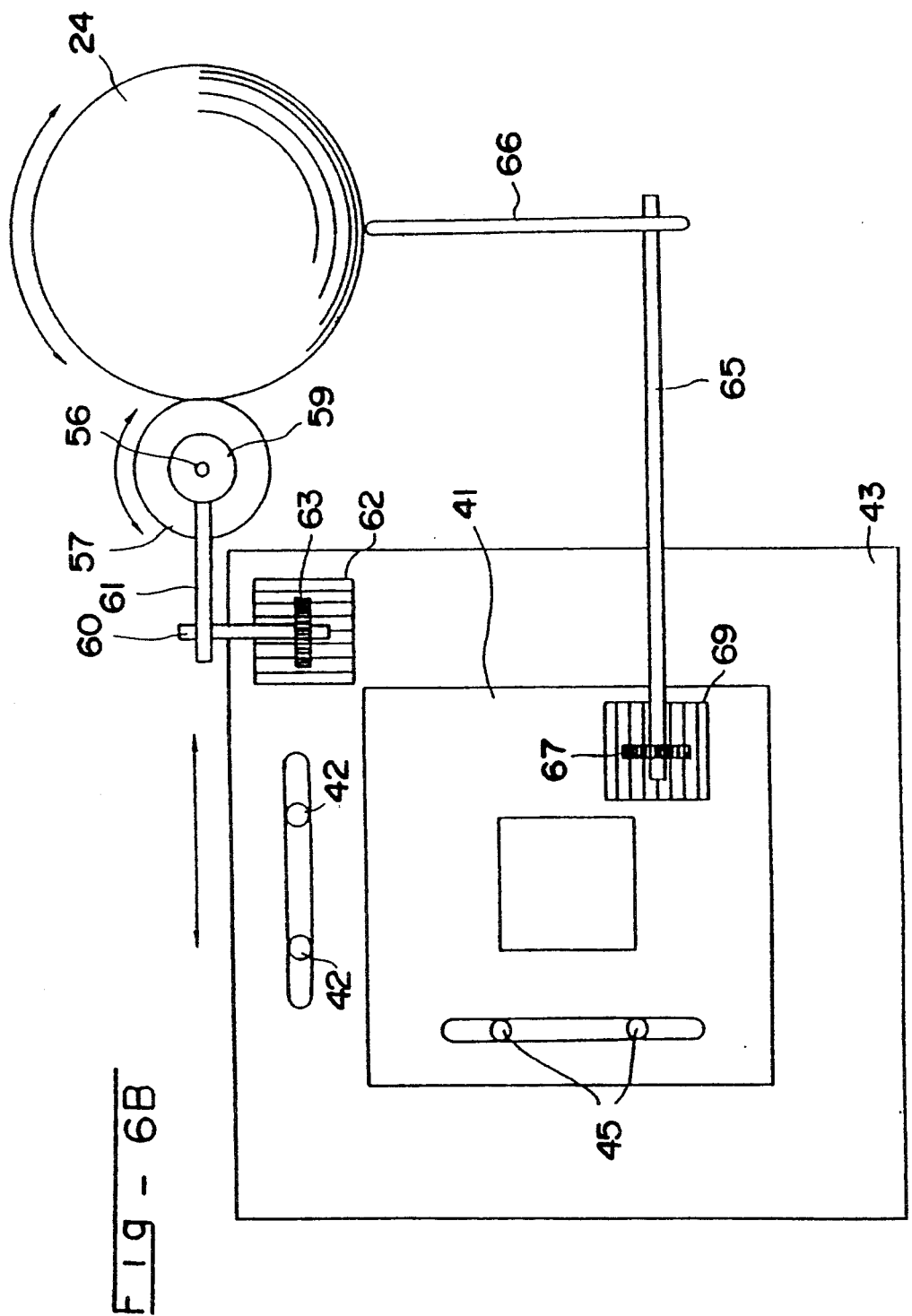

ARITHMETIC OPERATING MEANS

BACKGROUND OF THE INVENTION

1. Field of the Invention

The present invention relates to a measuring device for measuring a distance of an object to be photographed from a camera with which it is being photographed. More precisely, it relates to an object distance measuring device in a camera having an active autofocusing system with an infrared LED which emits light for measuring the distance of the object to be photographed.

2. Description of the Related Art

In a camera having an active autofocusing system with an infrared LED, an infrared light for measuring distance is emitted toward the object from the infrared LED provided in the camera body. This measuring light is then reflected by the object and received by a light receiver on the camera body, which detects the object distance in accordance with the measuring light. Based on the object distance thus obtained, a focusing lens of a photographing lens of the camera is moved to a focus position.

Upon taking a picture using such an autofocusing camera, a photographer must adjust a distance measuring zone located at the center of the field of view of a finder to be coincident with the object to be photographed. Thereafter, the photographer first pushes the release switch down a half step to focus the focusing lens, and then fully pushes the release switch down the full step to expose the film at the fixed camera angle. If a photographer wants to take a picture while making the focus point coincident with a portion of the field of view of a finder other than the center thereof, he or she must first adjust the object distance measuring zone located at the center of the field of view of a finder to be coincident with an object. The photographer then pushes the release switch down by a half step to lock the focus, and then change the camera angle to obtain a desired composition of the picture in the finder. When the desired composition is obtained, the release switch is pushed down by the full step to effect the exposure.

However, it is very difficult, particularly for a beginner, to move the camera to the desired position while pushing the release switch by a half step. Furthermore, if the release switch, which has been pushed down by a half step, is accidentally returned to the initial position during the movement of the camera, the focus lock is released, so that the object distance measuring must be effected again from the beginning, which is very troublesome.

SUMMARY OF THE INVENTION

The primary object of the present invention is to eliminate the drawback of the prior art as mentioned above by providing an object distance measuring device of a camera in which the object distance of a designated object in the field of view of the finder, can be measured without moving the camera.

To achieve the object mentioned above, according to the present invention, there is provided an object distance measuring device in a camera, including an object distance measuring unit having a light emitter which emits measuring light toward an object to be photographed and a light receiver which receives the measuring light as reflected by the object; a direction varying mechanism for varying the direction of the object distance measuring unit, a measuring position varying mechanism for varying the position of a measuring zone in a field of view of a finder and an object distance measuring unit driving mechanism for driving the object distance measuring unit to trace the movement of the measuring zone by the measuring position varying means, mechanism are provided to change the direction of the object distance measuring unit.

With this structure, the object distance of a designated object in the field of view of the finder can be measured without moving the camera, so that the measuring position can be easily made coincident with the object. Thus, no skill is required for the focusing operation.

According to another aspect of the present invention, there is provided an object distance measuring device in a camera, including an active object distance measuring mechanism for emitting measuring light toward an object to be photographed and receiving the measuring light as reflected by the object to detect the object distance measuring zone is provided in a finder to indicate a measuring position at which the measurement of the object distance by the active object distance measuring means is effected varying the position of the measuring zone in the finder, a mechanism for varying the measuring position measured by the object distance measuring mechanism and a device for coinciding the measuring zone in the finder and the measuring position of the active object distance measuring mechanism.

BRIEF DESCRIPTION OF THE DRAWINGS

The invention will be described below in detail with reference to the accompanying drawings, in which:

FIG. 6B is a front elevational view of FIG. 6A;

DESCRIPTION OF THE PREFERRED EMBODIMENTS

The illustrated non-limitative embodiment is directed to a still video camera.

Figure 5:
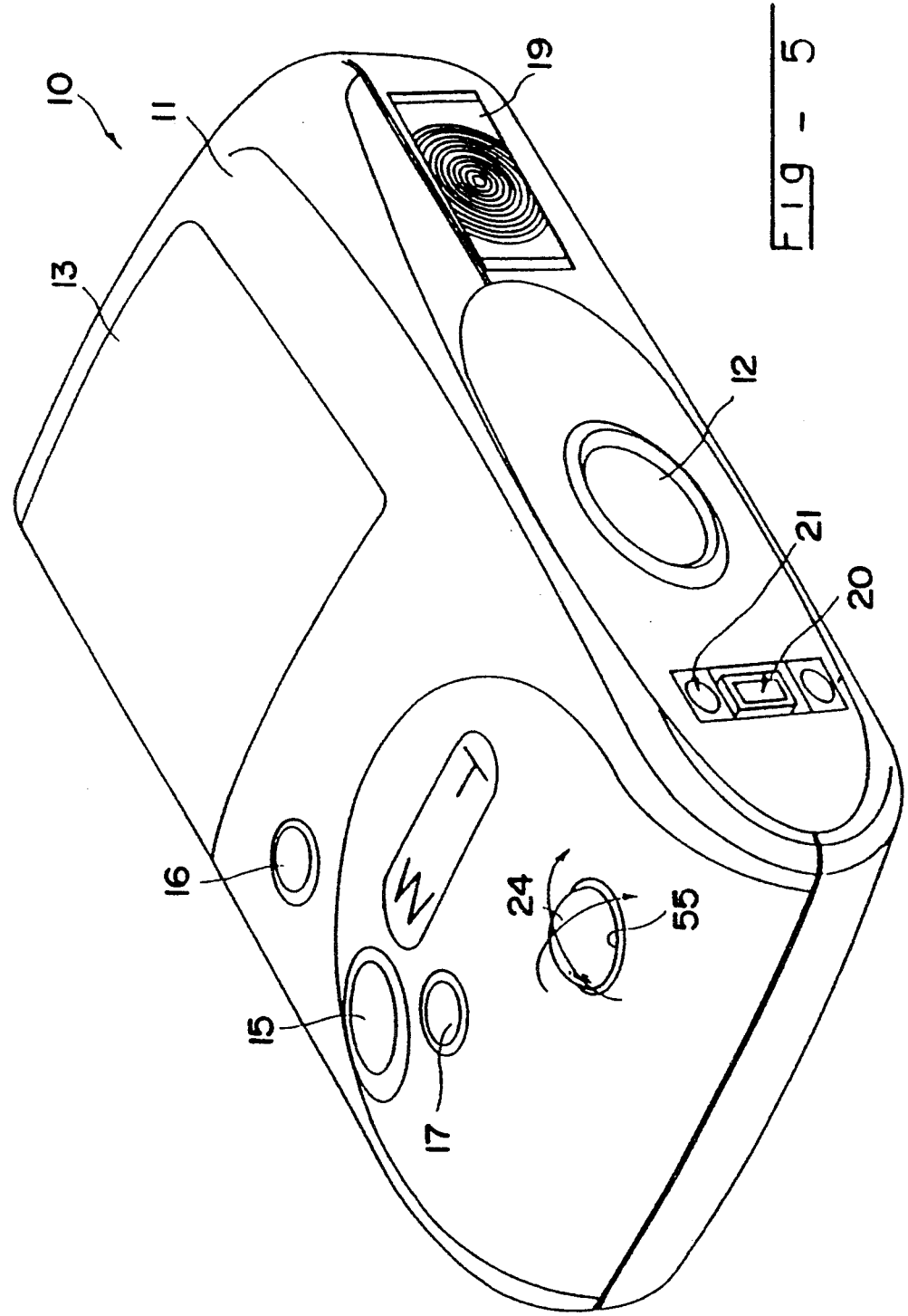
FIG. 5 is a perspective view of a still video camera to which the present invention is applied.

In FIG. 5, which shows the appearance of a still video camera 10 to which the present invention is applied, a camera body 11 has a photographing lens 12, a disc cover 13, a release switch 15, a compulsive strobe light emitting button 16, a± EF switch (exposure adjusting switch) 17, a finder unit 20, an object distance measuring unit 21, and a position varying track ball 24. The position that the object distance measuring unit 21;

at the time that actual distance measuring is performed is defined as a measuring position. Also, the camera body 11 has an indicating panel (not shown) which indicates various photographing data, such as the number of tracks of a magnetic disc which have already been used to take pictures, an image pickup device as an image processing and recording system, and a driver which drives the magnetic disc, etc.

Figure 2:
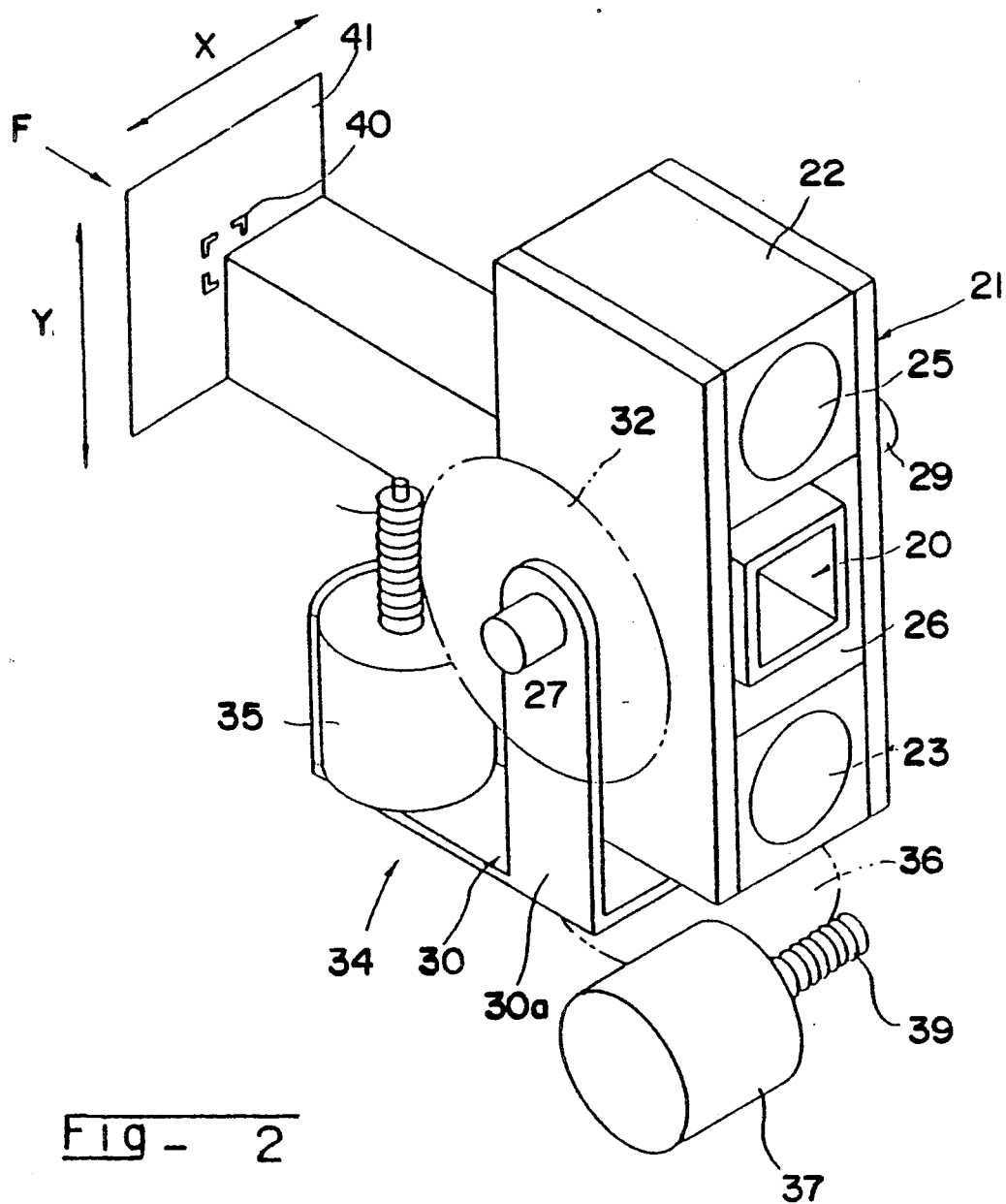
FIG. 2 is an enlarged perspective view of a main part of an object distance measuring device according to the present invention.
Figure 3:
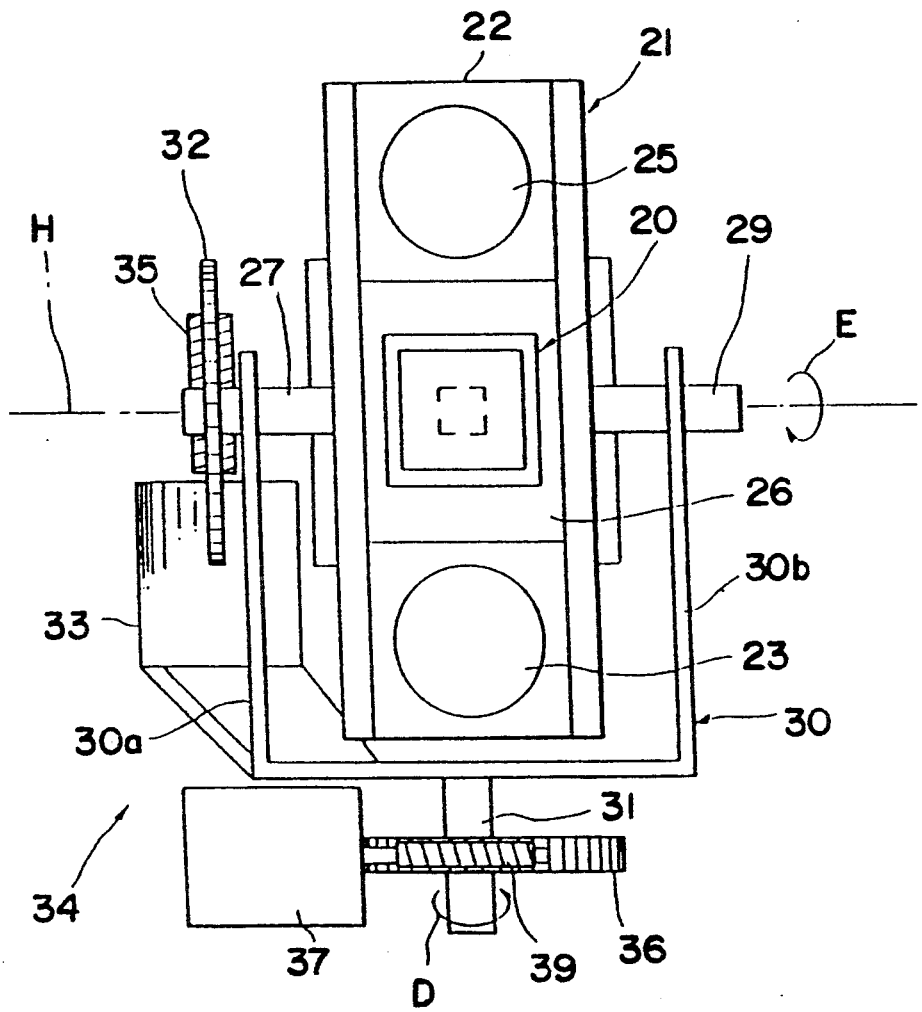
FIG. 3 is a front elevational view of FIG. 2.

FIGS. 2 and 3 show, on an enlarged scale, the object distance measuring unit 21 and an emission direction varying mechanism 34 which rotates the object distance measuring unit 21 about horizontal and vertical axes to vary the direction of the emission of measuring light.

The object distance measuring unit 21 has a frame body 22 which is provided on its upper and lower front portions with an infrared light receiver 25 and an infrared light emitter 23, respectively. The frame body 22 has a hollow portion 26 defined between the infrared light emitter 23 and the infrared light receiver 25. The finder unit 20 secured to the camera body 11 is inserted in the hollow portion 26. The frame body 22 has pivot pins 27 and 29 on its side plates.

The emission direction varying mechanism 34 has a frame body supporting bracket 30, a first motor 33 for rotating the frame body 22 about the horizontal axis in a vertical plane and a second motor 37 for rotating the frame body 22 about a vertical axis in a horizontal plane. The frame body supporting bracket 30 has arms 30a and 30b which rotatably support the associated pivot pins 27 and 29. The frame body supporting bracket 30 is provided on its lower surface with a pivot pin 31 which extends in the vertical direction perpendicular to a line H connecting the axes of the pivot pins 27 and 29. The pivot pin 31 is held by the camera body 11 so as to rotate the frame body supporting bracket 30 about the vertical axis of the pivot pin 31 in a horizontal plane. Accordingly, as shown in arrows D and E in FIG. 3, the frame body 22 can rotate, to vary the direction of the infrared light emitter 23 and the infrared light receiver 25. Thus the direction of the emission of the infrared measuring light varies in all directions.

The first motor 33 for rotating the frame body 22 about the horizontal axis of the pivot pins 27 and 29 is attached to the rear-end of the frame body supporting bracket 30. The first motor 33 is provided on its drive shaft with a worm gear 35 secured thereto which is in mesh with a spur gear 32 secured to the pivot pin 27. The second motor 37 for rotating the frame body 22 about the vertical axis of the pivot pin 31 is secured to the camera body 11 and has a worm gear 39 secured to a drive shaft thereof. The worm gear 39 is engaged by a spur gear 36 secured to the pivot pin 31.

Figure 4:
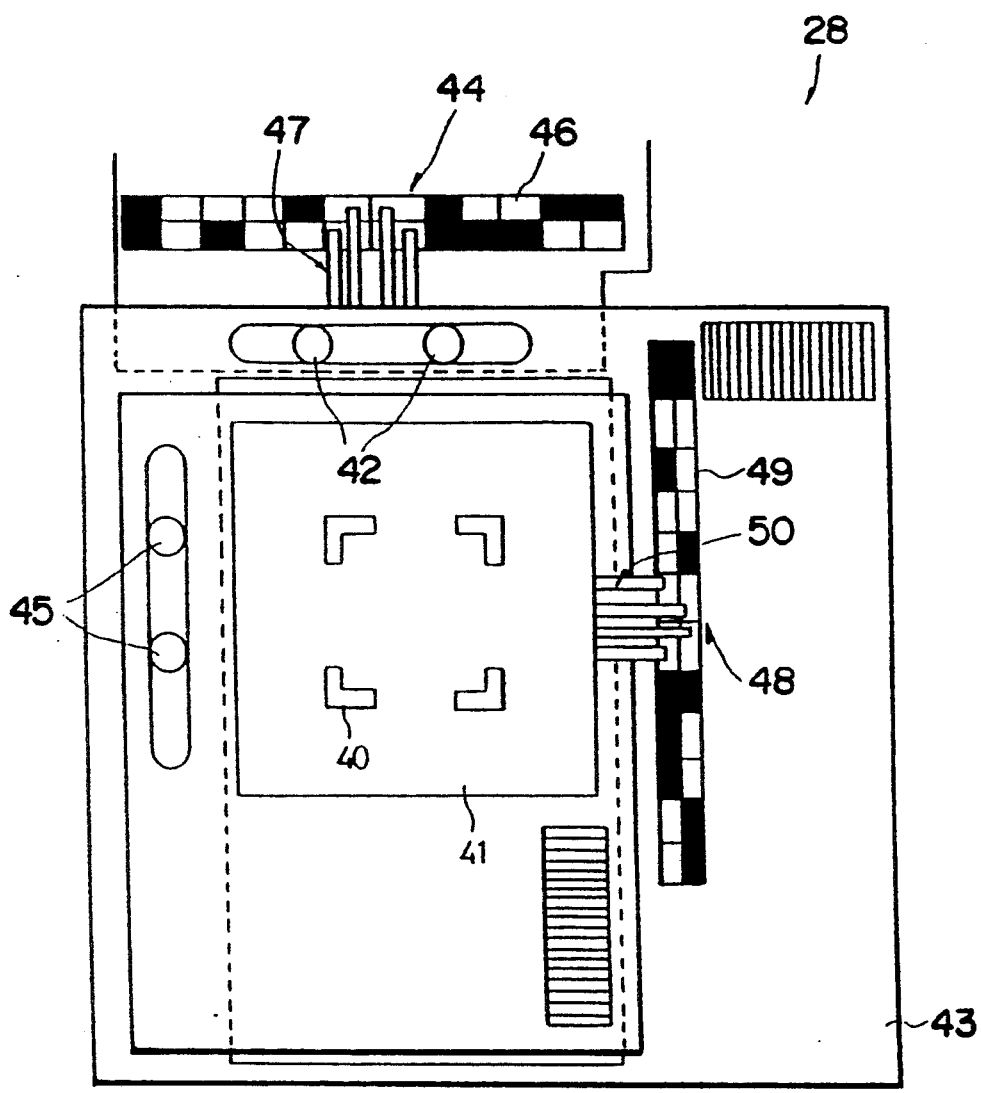
FIG. 4 is a schematic view of a detecting mechanism of an object distance measuring zone mark according to the present invention.

A position detecting device 28 is provided behind the finder unit 20, as shown in FIG. 4. The position detecting device 28 has an X-direction movable plate 43 and a Y-direction movable plate 41. The X-direction movable plate 43 is supported by pins 42 secured to the camera body 11 so as to slide in the horizontal direction (X-direction in FIG. 2). The X-direction movable plate 43 moves in the right- and left-hand directions X when the object distance measuring position varying track ball 24 rotates about a horizontal axis parallel with the optical axis of the photographing lens 12 in the vertical plane perpendicular to the optical axis of the photographing lens 12.

The Y-direction movable plate 41 has an object distance measuring zone mark 40 at the center thereof and is supported by pins 45 secured to the X-direction movable plate 43 so as to move in the vertical X-direction perpendicular to the direction X in FIG. 2. The area which is delimited by the finder zone mark 40 is defined as a measuring zone. The Y-direction movable plate 41 moves relative to the X-direction movable plate 43 in the vertical direction Y when the object distance measuring position varying track ball 24 rotates about a horizontal axis perpendicular to the optical axis of the photographing lens 12 in the vertical plane parallel with the optical axis of the photographing lens 12.

Figure 7:
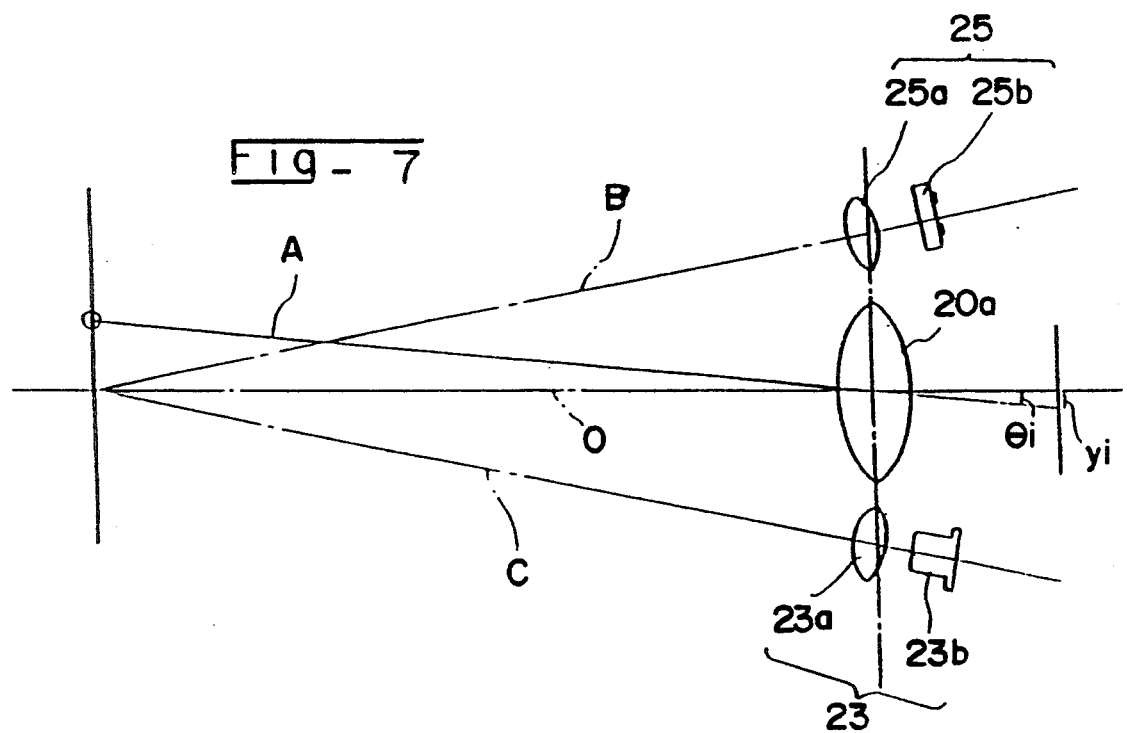
FIGS. 7 through 9 are schematic conceptual views for explaining the principle of the detection of a necessary angular displacement of an object distance measuring unit.
Figure 9:
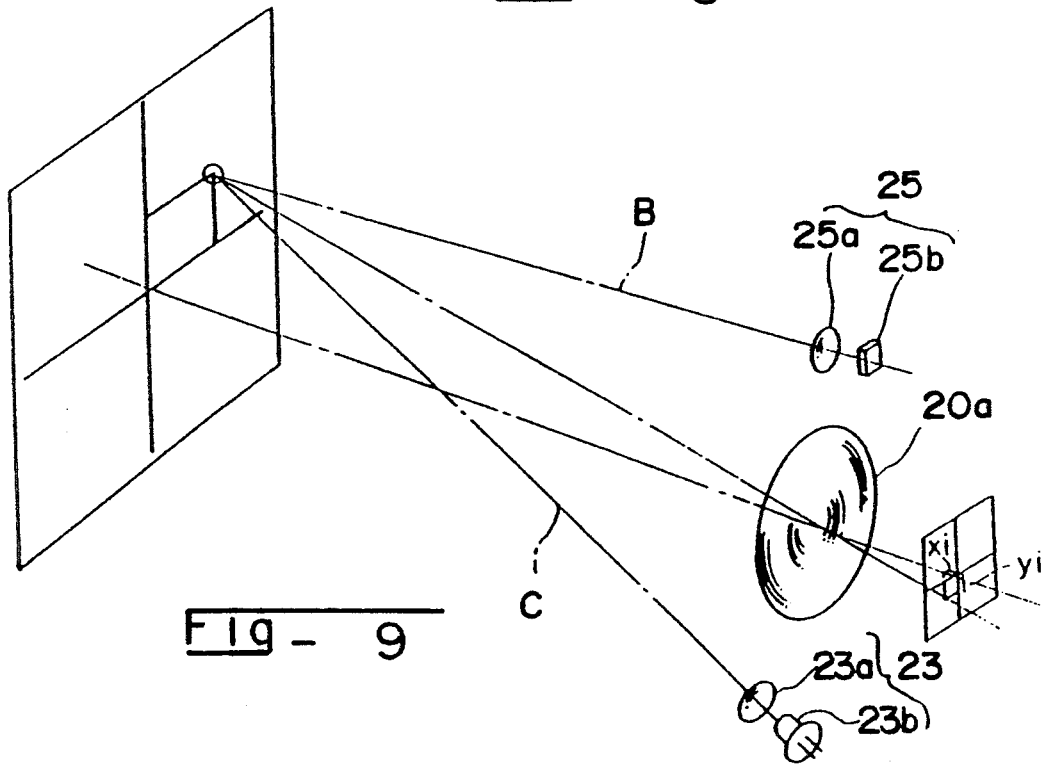

The camera body 11 has a code plate 46 having codes representing the deviation xi (FIG. 9) of light in the direction X with respect to the optical axis O of a finder lens 20a (FIG. 7). A position detecting brush 47 is mounted to the X-direction movable plate 43 to come into contact with the code plate 46 to detect the deviation xi.

The X-direction movable plate 43 has a code plate 49 having codes representing the deviation yi (FIG. 9) of light in the direction Y with respect to the optical axis O of a finder lens 20a. A position detecting brush 50 is mounted to the Y-direction movable plate 41 to come into contact with the code plate 49 to detect the deviation yi.

Figure 6A:
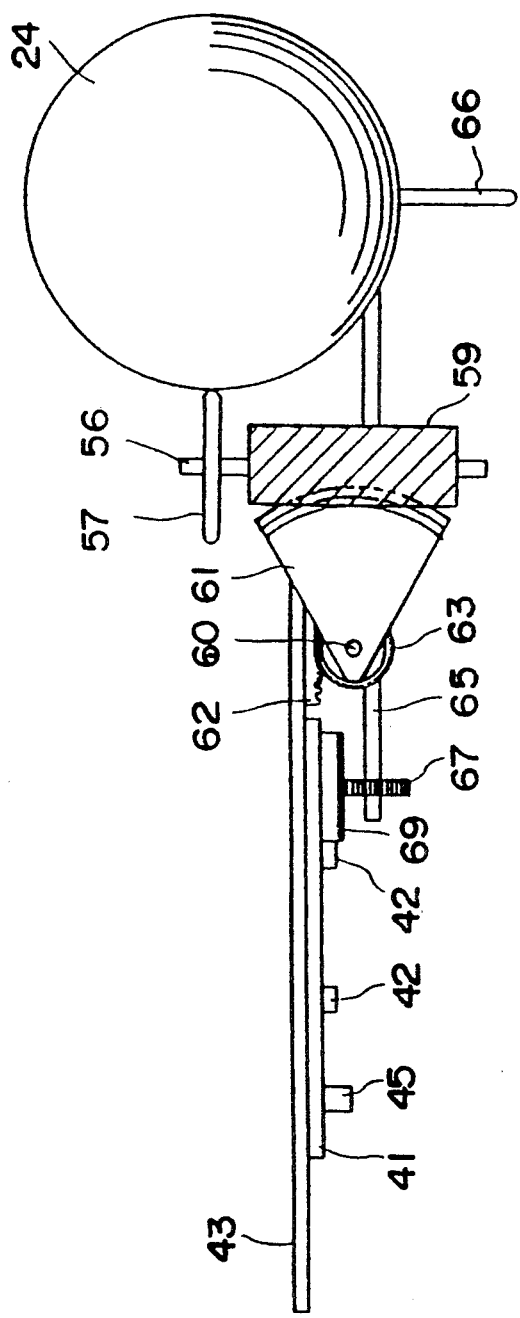
FIG. 6A is a plan view of a position varying track ball, an X-direction movable plate and a Y-direction movable plate, according to the present invention.
Figure 6C:
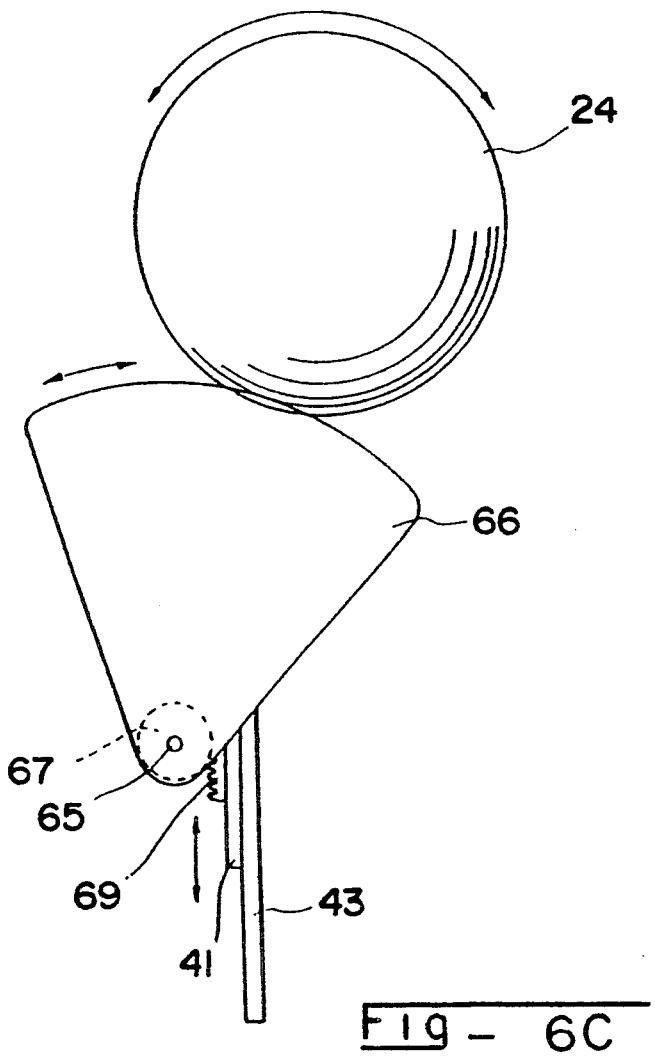
FIG. 6C is a side elevational view of FIG. 6B.

FIGS. 6A, 6B and 6C show the relationship between the X-direction movable plate 43, the Y-direction movable plate 41 and the position varying track ball 24.

The position varying track ball 24 is rotatably fitted in a hole 55 (FIG. 5) formed in the camera body 11. The camera body 11 has a rotatable horizontal shaft 56 which extends in the forward and rearward directions of the camera body 11, i.e. in parallel with the optical axis of the finder lens 20a. The shaft 56 has a roller 57 which rotates about the axis of the shaft 56 and a worm gear 59 secured to the shaft 56. The roller 57 is in contact with the position varying track ball 24, so that when the latter rotates about the axis parallel with the optical axis of the finder lens 20a in the clockwise and counterclockwise directions in FIG. 6B, the roller 57 rotates in the directions opposite thereto.

A rotatable vertical shaft 60 which extends in the vertical direction perpendicular to the shaft 56 is provided in the camera body 11. The vertical shaft 60 is provided on its upper and lower ends with a sector worm wheel 61 and a gear 63 which is in mesh with an X-direction rack 62 provided on a corner of the X-direction movable plate 43 respectively. The worm wheel 61 engages with the worm gear 59, so that when the position varying track ball 24 rotates in the clockwise and counterclockwise directions in FIG. 6B, the worm wheel 61 moves in the forward and rearward directions of the camera body 11 through the worm gear 59. As a result, the gear 63 rotates to move the X-direction movable plate 43 in the lateral direction of the camera body through the X-direction rack 62.

Similarly, the camera has a rotatable horizontal shaft 65 which extends in the lateral direction perpendicular to the shaft 56 and the shaft 60 and which is provided on its opposite ends with a rotatable sector member 66 and a gear 67 secured thereto. The sector member 66 has an arched side face which is in contact with the position varying track ball 24. The gear 67 engages with a Y-direction track 69 mounted to a corner of the Y-direction movable plate 41. Consequently, when the position varying track ball 24 rotates in the clockwise and counterclockwise directions in FIG. 6C, perpendicular to the direction of the rotation thereof in FIG. 6B, the sector member 66 moves in the forward and rearward direction parallel with the optical axis of the finder lens 20a. As a result, the rotation is transmitted to the rack 69 through the shaft 65 and the gear 67, so that the Y-direction movable plate 41 moves in the upward and downward direction in FIG. 6C.

Figure 1:
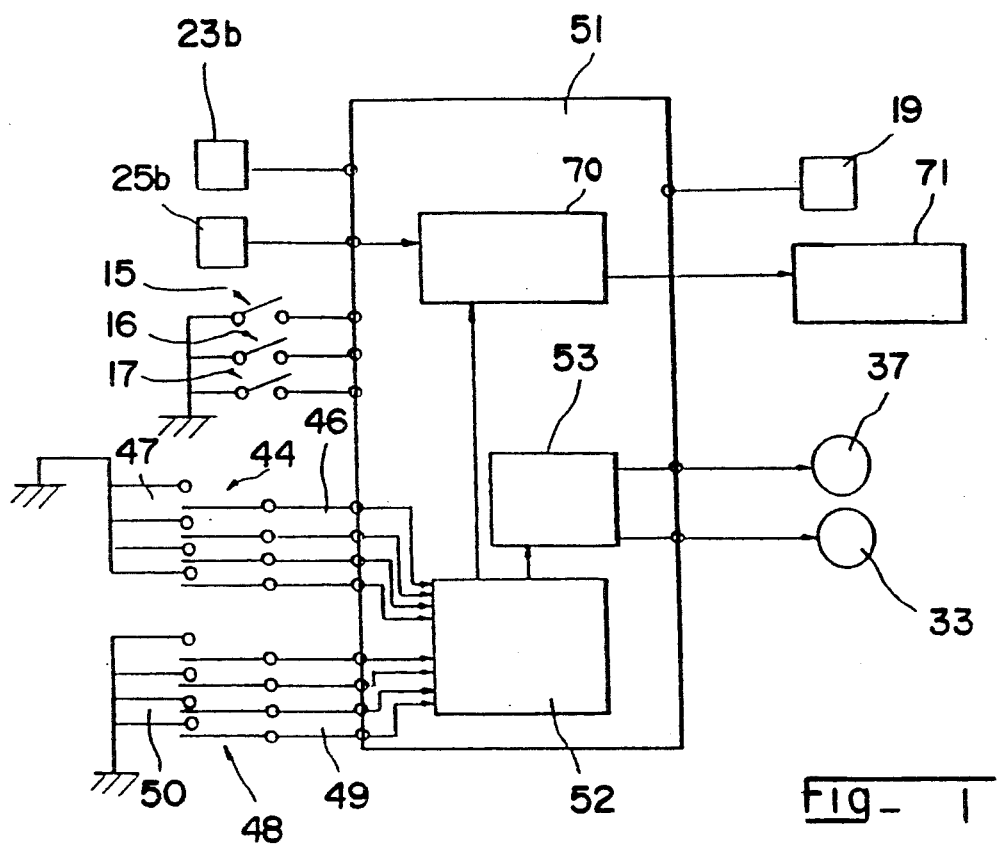
FIG. 1 is a block diagram of a main circuit of an object distance measuring device according to the present invention.

FIG. 1 shows a control circuit of an object distance measuring device according to the present invention.

To the input ports of the microcomputer 51 incorporated in the camera body 11 are connected the light receiving element 25b (PSD: Position sensitive device) of the infrared light receiver 25, the release switch 15, the compulsive strobe light emitting button 16, and the ±EF switch 17. Also, the X-direction detecting means 44 having the code plate 46 and the position detecting brush 47, and the Y-direction detecting means 48 having the code plate 49 and the position detecting brush 50 are connected to the input ports of the microcomputer 51. The strobe 19, the lens driving means 71, the light emitting element 23b of the infrared light emitter 23, the first motor 33 and the second motor 37 are connected to the output ports of the microcomputer 51. The microcomputer 51 includes an arithmetic operating i.e., calculating means 52 for determining the measuring position at which the measurement of the object distance is effected, the motor driving means 53 and an arithmetic operating i.e., calculating means 70 for driving lens driving means 71.

The arithmetic operating means 52 for determining the measuring position calculates the angular displacement $\theta i$ of the object distance measuring unit 20 necessary for making it coincident with the distance measuring zone mark 40, in accordance with the input data from the X-direction detecting means 44 and the Y-direction detecting means 48.

The motor driving means 53 rotates the first motor 33 and the second motor 37 in accordance with the result of the arithmetic operation of the arithmetic operating means 52. The motor driving means 53 constitutes an object distance measuring unit controlling means, together with the arithmetic operating means 52 and the position detecting device 28.

The arithmetic operating means 70 calculates the object distance in accordance with information from the light receiving element 25b and the deviations xi and yi and outputs drive signals in accordance with the distance data to the lens driving means 71 to drive the same thereby, to move the focusing lens to the focus position.

The necessary angular displacement of the object distance measuring unit 20 is determined, in accordance with the deviations xi and yi of the measuring position with respect to the optical axis O, as follows.

Figure 8:
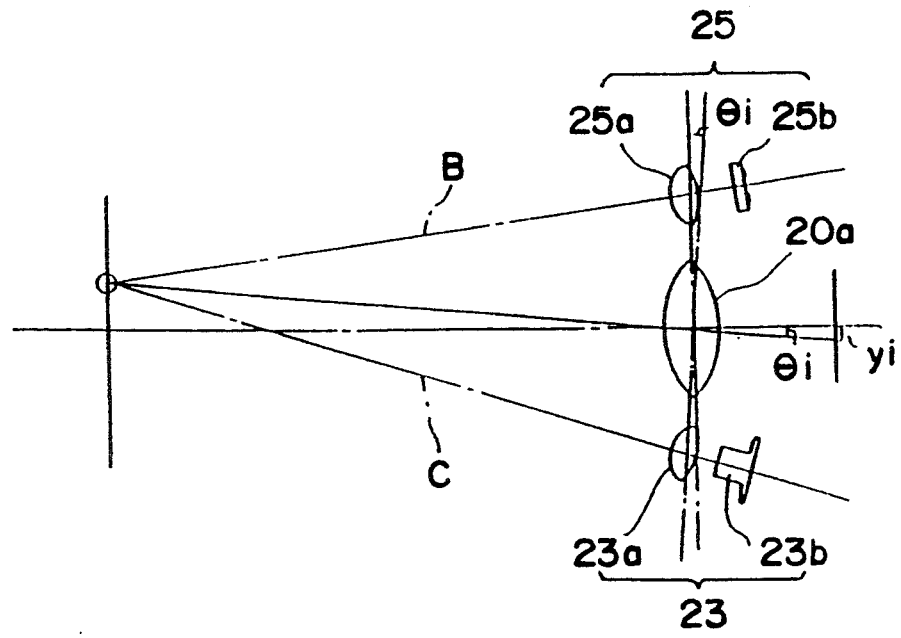

As can be seen in FIGS. 7 and 8, if the angle $\theta i$ (necessary angular displacement) of the light A incident upon an object deviated from the optical axis O of the finder lens 20a with respect to the optical axis O is very small, the following equation is obtained:

$$yi = f \times \tan\theta i$$

$$\theta i = \tan^{-1} yi/f \quad (1)$$

wherein f is the focal length of the finder lens 20a; and, yi is the deviation of the light A on an image plane from the optical axis O in the Y-direction.

Accordingly, the deviation yi can be converted to the angular displacement $\theta i$ based on the equation (1) mentioned above. Thus, the object distance measuring unit 21 is rotated in the direction Y by an angle $\theta i$ with respect to the optical axis O, so that the distance of an object deviated from the optical axis O by the deviation yi can be detected. Similarly, the deviation xi on the image plane in the direction X with respect to the optical axis O is electrically read (FIG. 9), and then the deviation xi is converted to the angular displacement $\theta i$ of the object distance measuring unit 21 in the direction X. Note that 25a in FIGS. 7 and 9 designates the light receiving lens of the infrared light receiver 25, and 23a the light emitting lens of the infrared light emitter 23, respectively.

Upon detecting the object distance, a photographer looks at the distance measuring zone mark 40 in the finder field of view through the finder unit 20 from the back of the camera body 11 in FIG. 5, i.e. from the direction F in FIG. 2. If the zone mark 40 is located at the center of the field of view, so that there is no deviation of the object from the optical axis O, the release switch 15 is pushed down by a half step to detect the distance of the object, and then is pushed by a full step to effect the exposure.

Conversely, if the object to be photographed is not to be located at the center of the field of view, so that the zone mark is not made coincident with the object to be focused, the camera 10 is moved to a desired position in which the object which is intended to be photographed is located in the field of view with a desired composition. Thereafter, the track ball 24 is rotated to make the zone mark 40 coincident with the object. As a result, the measuring zone mark 40 is moved in accordance with the direction of the rotation of the track ball 24. The displacements of the measuring zone mark 40 in the X-direction and the Y-direction are detected by the Y-direction detecting means 48 and the X-direction detecting means 44 which detect the positions of the Y-direction movable plate 41 and the X-direction movable plate 43 in the Y-direction and the X-direction, respectively.

The detected data of the Y-direction detecting means 48 and the X-direction detecting means 44 is input to the microcomputer 51, so that the necessary angle $\theta i$ of the object distance measuring unit 21 in the directions X and Y is calculated by the arithmetic operating means 52. The motor driving means 53 outputs the drive signals to the first and second motors 33 and 37 in accordance with the angular displacement $\theta i$ to rotate the object distance measuring unit 21 in the directions X and Y. When the optical axis c of the light emitting lens 23a becomes coincident with the object with which the zone mark is made coincident, the object distance measuring unit 21 is stopped.

When the release switch 15 is pushed down a half step, the infrared light is emitted from the light emitting element 23b toward the object to be taken. The light reflected by the object is received by the light receiving element 25b. Thereafter, the arithmetic measuring operation of the object distance is commenced in accordance with the information from the light receiving element 25b and the deviations xi and yi by the arithmetic operating means 70 for driving the lens driving means 71. Thereafter, the lens driving means 71 is driven in accordance with the data thus obtained by the arithmetic operation to move the focusing lens until the lens is focused. After that, focused the release switch 15 is pushed down a full step to actuate the shutter in order to expose an image of the object in the CCD. Thus, the image data of the object is written into a floppy disc loaded in the camera body through the disc cover 13.

It is possible to memorize the stepped angular displacements θi of the object distance measuring unit 21 which are preset to correspond to the deviations xi and yi read from the code plates 46 and 49, for example in a ROM. In this alternative, the stored data can be directly read from the ROM in accordance with the movement of the zone mark 40 to move the object distance measuring unit 21 without through the arithmetic operating means 52.

The present invention is not limited to the illustrated embodiments and can be applied for example to a common still camera using a silver salt picture.

Note that the terms "vertical" and "horizontal" referred to in the specification mean the vertical and horizontal directions when the camera is located in a normal position, that is, when the camera lies substantially in a horizontal plane, as shown in FIG. 5.

We claim:

1. An object distance measuring device in a camera, comprising:
    an object distance measuring unit having a light emitter which emits measuring light toward an object to be photographed and a light receiver which receives the measuring light as reflected by the object;
    a direction varying mechanism for varying the direction of said object distance measuring unit;
    measuring position varying means for varying the position of a measuring zone in a field of view of a finder; and
    object distance measuring unit controlling means for controlling said object distance measuring unit to follow the movement of said measuring zone by said measuring position varying means, thereby to change the direction of said object distance measuring unit.

2. An object distance measuring device according to claim 1, wherein said light emitter comprises an infrared light emitting element.

3. An object distance measuring device according to claim 1, wherein said light receiver comprises an infrared light receiving element.

4. An object distance measuring device according to claim 3, wherein said light receiving element is a position sensitive device.

5. An object distance measuring device according to claim 1, wherein said object distance measuring unit comprises a frame body which supports said light emitter and said light receiver.

6. An object distance measuring device according to claim 5, wherein said direction varying mechanism comprises a frame body supporting bracket which supports said frame body for rotation about two orthogonal axes, and first and second motors for rotating said frame body supporting bracket around the two orthogonal axes.

7. An object distance measuring device according to claim 1, wherein said measuring position varying means comprises a Y-direction movable plate which is movable in a Y-direction and which includes said measuring zone, and an X-direction movable plate which movably supports said Y-direction movable plate for movement in the Y-direction, said X-direction movable plate is movable in an X-direction perpendicular to the Y-direction, a driving force transmitting means for driving said X-direction movable plate and said Y-direction movable plate, and a position varying track ball which rotates to transmit the driving force to said X-direction movable plate and said Y-direction movable plate.

8. An object distance measuring device according to claim 7, wherein said measuring zone includes a zone mark which is provided on said Y-direction movable plate.

9. An object distance measuring device according to claim 1, wherein said object distance measuring unit driving means comprises a position detecting means for detecting the position of said measuring zone, an arithmetic operating means for calculating the angular displacement of said object distance measuring unit necessary for following said measuring zone in accordance with the detected data of said position detecting means, and a driving means for driving said object distance measuring unit in accordance with the result of the arithmetic operation of said arithmetic operating means.

10. An object distance measuring device according to claim 9, wherein said position detecting means comprises an X-direction detecting means and a Y-direction detecting means which detect said measuring displacement of the zone in the X-direction and said Y-direction, respectively.

11. An object distance measuring device according to claim 10, further comprising a finder lens.

12. An object distance measuring device according to claim 11, wherein said X-direction detecting means comprises a code plate having codes in accordance with the deviation of an X-direction movable plate in an X-direction from said; optical axis of the finder lens and a position detecting brush which comes into contact with said code plate to detect the deviation in the X-direction.

13. An object distance measuring device according to claim 11, wherein said Y-direction detecting means comprises a code plate having codes in accordance with the deviation of an Y-direction movable plate in the Y-direction from said and optical axis of the finder lens and a position detecting brush which comes into contact with the code plate to detect the deviation in the Y-direction.

14. In an object distance measuring device in a camera, including an active object distance measuring means for emitting measuring light toward an object to be photographed and receiving the measuring light as reflected by the object to detect the object distance, and a measuring zone provided in a finder to indicate a measuring position at which the measurement of the object distance by said active object distance measuring means is effected, said device comprising:
    means for varying the position of said measuring zone in said finder;
    means for varying the position measured by said active object distance measuring means; and
    means for coinciding said measuring zone in said finder and the measuring position of said active object distance measuring means.

* * * * *

UNITED STATES PATENT AND TRADEMARK OFFICE
CERTIFICATE OF CORRECTION

PATENT NO. : 5,096,289
DATED : March 17, 1992
INVENTOR(S) : M. MOGAMIYA et al.

It is certified that error appears in the above-indentified patent and that said Letters Patent is hereby corrected as shown below:

On title page, in section [54], the title, change "ARITHMETIC OPERATING MEANS" to ---OBJECT DISTANCE MEASURING DEVICE IN CAMERA---.

On the cover, in section [56], "References Cited", "U.S. PATENT DOCUMENTS", insert ---4,571,048  2/1986 Sugawara---.

At column 8, line 36 (claim 12, line 5), change "said:" to ---said---.

At column 8, line 44 (claim 13, line 5), change "said and" to ---said---.

At column 8, line 46 (claim 13, line 7), change "the" (first occurrence) to ---said---.

Signed and Sealed this

Fifteenth Day of October, 1996

Attest:

BRUCE LEHMAN

*Attesting Officer*  *Commissioner of Patents and Trademarks*